United States Patent [19]

Misciagno et al.

[11] Patent Number: 5,637,265
[45] Date of Patent: Jun. 10, 1997

[54] PAD PRINTING COATING COMPOSITION AND PAD PRINTING PROCESS

[76] Inventors: Frank V. Misciagno, 1086 Park Blvd., Massepequa Park, N.Y. 11762; Gregory C. Young, 4 Homer Pl., Poughkeepsie, N.Y. 12603; George A. Skoler, 6 Carriage Way, White Plains, N.Y. 10605

[21] Appl. No.: 294,975

[22] Filed: Aug. 24, 1994

Related U.S. Application Data

[63] Continuation of Ser. No. 968,221, Oct. 29, 1992, abandoned, which is a continuation of Ser. No. 698,485, May 9, 1991, abandoned.

[51] Int. Cl.$^6$ ................................................ B29D 11/00
[52] U.S. Cl. .................... 264/1.7; 264/2.6; 427/164; 351/162; 351/177; 523/106; 101/41; 101/163; 101/491; 524/44; 524/503; 524/556
[58] Field of Search ................ 101/41, 491, 163; 351/162, 177; 524/556, 317, 367, 379, 320, 503, 44; 264/1.7, 2.6; 427/164; 523/106

[56] References Cited

U.S. PATENT DOCUMENTS

| | | | |
|---|---|---|---|
| 4,212,642 | 7/1980 | Della Casa et al. | 106/22 |
| 4,273,734 | 6/1981 | Seiderman | 524/916 |
| 4,451,329 | 5/1984 | Batchelor et al. | 430/270 |
| 4,471,079 | 9/1984 | Enami | 524/555 |
| 5,034,166 | 7/1991 | Rawlings et al. | 264/1.7 |
| 5,158,718 | 10/1992 | Thakrar et al. | 264/1.4 |

*Primary Examiner*—Andrew E. C. Merriam
*Attorney, Agent, or Firm*—Stephen Gates; Glenna Hendricks

[57] ABSTRACT

A transfer-pad printing composition comprising either a latex or solution coating composition comprising a coating vehicle and a monomeric or polymeric hydroxylated and/or carboxylated surface active wetting agent that is coating compatible with the pad surface such that the coating composition, provided in the shape of a pattern, is precisely imprinted on its surface and the pad can precisely transfer the design to another surface that is receptive to the coating. The process of transfer-pad printing with the composition. Also, articles made by such transfer printing.

20 Claims, 8 Drawing Sheets

PAD PRINTING COATING COMPOSITION AND PAD PRINTING PROCESS

This application is a continuation of application Ser. No. 07/968,221, now abandoned, filed Oct. 29, 1992, which in turn is a continuation of application Ser. No. 07/698,485, filed May 9, 1991, now abandoned.

BRIEF DESCRIPTION OF THE INVENTION

A pad printing coating composition and process comprising either a latex or solution coating composition comprising a coating vehicle and a monomeric or polymeric wetting agent that is coating compatible with the pad surface so that the coating composition, provided in the shape of a pattern, is precisely imprinted on its surface. As a result, the pad precisely transfers the design to another surface that is receptive to the coating.

BACKGROUND TO THE INVENTION

Pad or transfer-pad printing is a well establish commercial method for transferring a wet coating in the form of a thin design to another substrate, typically a dimensionally altered shaped surface such as one having a rounded or irregularly shape. It differs from printing in that it does not rely on a typeface in transferring the design. Pad printing has been used commercially for many applications. It has been used to print patterns on light bulbs, watch faces, golf balls; form printed circuits on dielectric substrates; imprint bar codes on a variety of surfaces; and add patterns to a contact lens mold (see copending U.S. applications Ser. Nos. 222,709, filed Jul. 21, 1988, and 329,431, filed Mar. 28, 1989) or on a contact lens (see U.S. Pat. No. 4,582,402, patented April 15, 1986, U.S. Pat. No. 4,704,017, patented Nov. 3, 1987, U.S. Pat. No. 4,946,269, and U.S. Pat. No. 4,946,269).

There are a number of transfer-pad printing systems being sold for such commercial applications.[1] Though these system are automated and geared to accurately transfer the pattern from a printing block (cliché) that contain the wet coating design to be transferred, a critical step in the process involves accurately picking up the coating design from the cliché, and not altering the design while it lays on the pad prior to transfer coating to a receiving printing surface onto which the design is to be imprinted.

[1] For example, such systems are obtainable from Trans Tech America, Inc., Schaumburg, Ill. 60193; Markem Corporation, Keene, N.H. 03431; Tampo-Print GmbH, Munich and Stuttgart, Germany.

There are a number of patents that describe apparatus suitable for transfer-pad printing. They include the following U.S. Pat. Nos.: 4,060,031; 4,282,807; 4,615,266; 4,779,531; 4,803,922 and 4,856,670. These apparatus are generally applicable to this invention.

A typical transfer-pad (also called a "tampon.") is made of low durometer rubber. The softness and compressibility of such rubber pads allows them to deform under mild pressure to be gently superimposed onto the coating design on the cliché. As a result, the pad compresses as pressure is applied to the cliché and this allows the pad to deform, to present a larger surface at the cliché-pad interface, thereby enshroud the coating design and pick up the design. For example, a design is engraved by etching into the cliché. A flowable coating composition is knife (doctor blade) coated onto the surface of the cliché, to fill up the engraved design with it. Then the tampon is caused to come into contact with the cliché's design, and as the pad is deformed and compresses over the coating composition on the engraved surface of the cliché, the surface of the pad contacting the surface of the cliché temporarily adopts the shape of the cliché's surface. If the pad is sufficiently soft and compressible, a portion of it that is contiguous to the coating design, will dwell within the engraved surface forming the design coating pattern on the cliché. This causes the flowable coating composition in the etched pattern on the cliché to make contact with the pad surface and if it sufficiently wets it, the pad will pick up coating replicating the design quite accurately. Before the coating dries on the pad surface, it is transferred to the printing surface.

Reproducing the design on a cliché on another substrate is dependent upon the ability of the coating composition deposited in the cliché to effectively wet the surface of the transfer-pad. If the coating composition, be it ink or paint, does not properly wet the pad's surface, then two things can happen. One, the pad will not completely pick up the coating in the design provided in the cliché. Second, the pad may pick up the coating design, by suction of a sufficient mass of the coating, but prior to transferring the design to the desired surface, the design breaks up (or beads up) on the pad because of an incompatibility between the coating and the pad's surface.

Another factor in transfer-pad printing that cab adversely affect the ability to properly transfer a flowable coating design to a printing surface, involves aging of the transfer pad. Over a period of time, the surface of the transfer-pad should pick up in its pores small amounts of the coating and/or its solvent components. With time, enough of a concentration of the coating should become imbedded in the surface of the pad so that the surface area of the pad is increased, or solvent attacks of the pad and permanently increases the pad's surface area, or a combination of these actions occurs. This added surface can create sites amenable to oxygen absorption leading to chemisorption of oxygen over the pad's surface. The result could change the surface characteristics of the pad sufficiently to adversely affect the wettability of the pad by the coating composition, even though the coating composition properly wets a new pad surface.

A popular transfer-pad rubber material is silicone rubber. Such rubbers are low durometer poly(dimethylsiloxane), generally of the RTV (room temperature vulcanization) type. RTV silicone rubbers are frequently made by the reaction of a difunctional dimethylsiloxane oil of the formula:

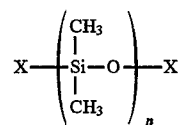

wherein X is a hydrolyzable or condensable group such as halogen, alkoxy, aroxy, amino and hydroxyl; with a tri- or tetrafunctional silane of the formula:

wherein R may be X or organic bonded to the silicon by a carbon to silicon bond.

Silicone rubbers are notoriously well known to resist wetting by water. It should be noted that new silicone tampons typically contain silicone oil that exudes from the pad. That oil is recommended to be removed before the pad is used. This can involve wiping the pad, or washing it with a degreaser. Over time and use, the tampon becomes dirty and requires pad cleaner or plastic tape. Pad cleaners are stated to be only mildly aggressive and will not excessively dry out the silicone pad. Storage of the pad is proper when the pad is cleaned with a pad cleaner and then coated with a oil that penetrates into the pores of the pad.

It has been determined that latex coating compositions are not effectively transfer-pad printed because the desired design is not efficiently or accurately transferred to the printing surface. Latex coating tend to bead up on the tampon's surface, breaking up the design sufficiently that the resultant imprinted product is a poor replication of the original design.

It would be desirable to use latex coatings in pad transfer printing since they contain less volatile organic compounds (VOCs), and therefore, they are more environmentally desirable. Much of a latex coating composition is water. As compared to conventional solution coatings and inks, they contain much less VOCs and their use generates less VOC pollutants.

In the case of solution coatings or inks, they appear to be affected by aging of the silicone rubber transfer-pad. Over time and use, silicone transfer-pads become worn and present a more oxygenated surface that alters the pad's surface wetting characteristics. Such a pad will not efficiently or accurately transfer a replicated pattern of a solution based coating or ink composition to the desired surface.

Typical solution inks and coatings comprise an oleoresinous or oleophilic coating vehicle dissolved in solvents and in which dyes and/or pigments are dispersed. To the extent the surface of the tampon is oleophilic, such inks and coating are sufficiently compatible that they readily and effectively transfer from the cliché to the pad's surface and are retained thereon without loss of print definition, i.e., replication of the cliché's design. However, when the pad's surface ages, and becomes less oleophilic, the ink's or coating's compatibility with the surface is measurably reduced. This does not mean the pad's surface is wholly oleophilic. It merely means that the level of oleophilicity has been reduced to the extent that the ink or coating is not as wholly compatible as it was prior to the aging phenomena.

This problem is especially acute when the design being printed requires accurate and essentially complete replication on the printing surface. For example, a printed circuit requires that the pattern of the design be uniform and non-interrupted. A cosmetic contact lens requires that the design from lens to lens be uniform so that the right and left eyes appear the shine, even if the wearer has to replace one of a set of lenses. In addition, the cosmetic appearance of a contact lens will be dependent upon an accurate reproduction on the lens or in the lens, of the original design.

These problems are magnified in the case of automated pad printing system since the value of the system is generally dependent upon the extent of its on-line operation. Down time in the operation of the system has a material affect on the economics of the printing operation. Stopping of printing to correct inaccurate printing or replace tampons can be a serious economic penalty in such operations.

THE INVENTION

This invention deals with the special surface characteristics of tampons used in transfer-pad printing so that excellent replicated prints can be made with aqueous containing coating or ink compositions and with wholly organic solution coating or ink compositions. In particular, this invention relates to modifying the composition of the liquid coating or ink used in forming the pad printing on the printing surface. The composition is modified such that when the liquid coating prior to modification fails to properly wet the tampon's surface, it is rendered compatible with the tampon's surface by the modification so that it wets the surface sufficiently to completely replicate the print on the surface. The invention relates to novel latex and solution coating or ink compositions that can accommodate incompatibilities of the tampon's surface either when it is initially used in pad-transfer printing or that occur during use. In particular, the invention is directed to novel water-based latexes and organic solvent-based solution compositions comprising a. a film forming coating liquid dissolved in an organic solvent that is converted to a thin solid fiber on a solid substrate
  i. by virtue of the evaporation of a solvent in the case where the coating liquid is thermoplastic, or
  ii. by virtue of the evaporation of a solvent and curing to a thermoset state when the coating liquid is thermosetting; and
b. a wetting agent comprising an organic monomeric or polymeric compound containing pendant or terminal hydroxyl or carboxyl groups,
  i. at least a portion of which is dissolved in the aqueous phase in the case of the water-based latexes, and
  ii. at least a portion of which is dissolved in the solution in the case of the organic solvent-based solution compositions.

This invention relates to a transfer-pad printing composition comprising either a latex or solution coating composition comprising a coating vehicle and a monomeric or polymeric hydroxylated and/or carboxylated surface active wetting agent that is coating compatible with the pad surface such that the coating composition, provided in the shape of a pattern, is precisely imprinted on its surface and the pad can precisely transfer the design to another surface that is receptive to the coating.

In one embodiment, the invention relates to a latex or emulsion coating composition comprising an oil in water or water in oil emulsion. The oil phase of the emulsion comprises the coating composition in the form of a resin, polymer or rubber that is stable in the water phase because of the presence in the emulsion of either an anionic, cationic or nonionic surfactant residing at the oil and water interfaces. The emulsion contains coloring or filler, as needed, for the coating. The improvement of this invention is to provide a water dispersible or soluble organic material in the aqueous phase that acts as a wetting agent for the composition when transfer printed. The wetting agent is viewed to bond to the latex oil phase, though bonding weaker than covalent bonding with the interfacially located surfactant in the oil phase. The dispersible or soluble organic wetting agent contains sufficient organic carbon that it significantly aids in wetting a transfer-pad printing surface. Such bonding is facilitated when the organic material contains hydroxyl and/or carboxyl groups that are capable of associating with the interfacially located surfactant in the latex composition.

In a further embodiment of the invention, the latex or emulsion coating composition comprises a fully formed oil in water emulsion or a water in oil emulsion to which is added a wetting agent of an organic monomeric or polymeric compound containing pendant or terminal hydroxyl or carboxyl groups. It is preferred that the organic monomer or polymer be dissolved in the water phase or resides at the oil and water interface of the emulsion. In a preferred embodiment, the organic monomeric or polymeric compound is a minor component of the latex coating composition relative to the concentration of the coating vehicle therein. It is also preferred that the monomeric or polymeric compound is a minor component of the latex coating composition relative to the water content of the latex formulation.

In a further embodiment of the invention, the ink or coating solution is rendered less oleophilic such that it is more compatible with the pad's aging surface by including in the ink or coating solution of an organic monomeric or polymeric compound containing pendant or terminal hydroxyl or carboxyl groups. It is preferred that the organic monomeric or polymeric compounds not be the coating vehicle of the ink or coating formulation. In a preferred embodiment, the organic monomeric or polymeric compound is a minor component of the ink or coating formulation relative to the concentration of the coating vehicle therein. It is also preferred that the monomeric or polymeric compound is a minor component of the ink or coating formulation relative to the solvent component of the formulation.

DETAILED DESCRIPTION OF THE INVENTION

Figure 1:
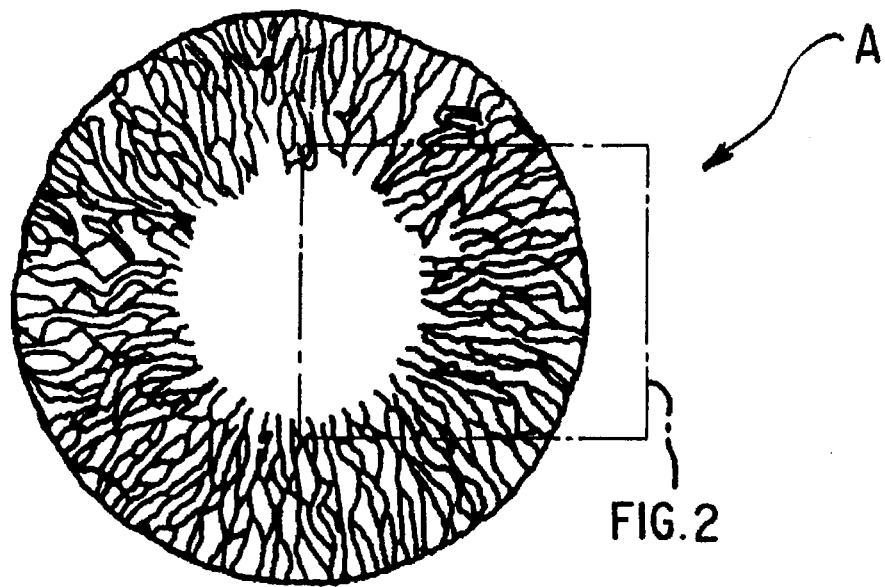
FIG. 1 depicts plan view of a decorative cosmetic contact lens pattern to illustrate a cut-away segment that is video imaged with different coating compositions.

In the development of this invention, it was noted that conventional latex coating compositions, such as artist latex prints, will print on complex surfaces by pad-transfer printing. However, it was noted that the replication of the design from the cliché to the receiving surface was irregular, oftentimes the pattern had a spotty appearance and lines in the design became interrupted. It was found that the addition of a hydroxylated monomer overcame those deficiencies in pad-transfer printing. One belief was that the monomer addition to the latex thickened the latex and made it more capable of holding its pattern when pad-transferred. That assumed that originally, the latex was not viscous enough for effective printing. However, when a thickened latex was used, such as by the addition of siliceous thickener, the latex printed poorly. The basis for enhanced printing by virtue of a surface active effect grew out of findings that a number of different materials beneficially affected the printing capabilities of latexes on a variety of surfaces through pad printing and that these materials had in common the capability of enhancing wetting of the tampon when viewed as oleophilic surface active agents for the resin latex particles.

The latex and solution coating compositions usable in the practice of this invention may be those commonly employed in the art. Inks are commonly used in pad-transfer printing, and for the purpose of this invention, they are termed coating compositions. Latex compositions comprise a thermoplastic polymer dissolved in a solvent that is suspended in a discontinuous phase as small liquid particles in water. Water is typically the continuous phase. These compositions are oil-in-water emulsions. The suspension stability of the particles are assured by the presence at the interface of the particles and the water of surface active materials. The surface active materials may be anionic, cationic or nonionic. The moieties of the surface active materials that generate the anionic, cationic or nonionic condition, are each attracted to the water phase. Those moieties are termed hydrophilic because they are attracted to the "water" phase of the emulsion. Each of these materials contains a component that is not attracted to the water phase, but rather, it is attracted to the thermoplastic polymer and the solvent in which it is dissolved. That component is termed oleophilic in that it is attracted to the "oil" phase of the emulsion.

Typical latexes comprise thermoplastic polymeric materials that are dissolved in a solvent and with surfactants and emulsification in water are cased to form water borne latex coating systems. They are commonly based upon acrylic resins, vinyl acetate resins, copolymeric resins containing acrylics or vinyl acetate, and the like. The acrylic resins are based upon homopolymers and copolymers of acrylates and methacrylates such as methyl acrylate, ethyl acrylate, 2-ethylhexyl acrylate, and the like, methyl methacrylate, n-propyl methacrylate. The vinyl acetate resins are homopolymers and copolymers derived from vinyl acetate. The solution coating system is typically a wholly organic solvent borne system and usually is made from those coating materials commonly used as inks. They may be cellulosic based, thermosplastics such as the acrylics or the vinyl acetates, and the like; or they may use thermosetting resins, such as epoxides, alkyds, polyesters, and the like.

Silicone transfer pads contain the organosiloxanes that are notoriously known to be hydrophobic, that is, they reject water. They may also be termed oleophilic. When a latex is deposited onto such a surface, the water component is rejected and the latex beads up with the beading of the water component. So if a latex is printed onto such a surface as a complex design, the design will break up into a large number of beaded components, thereby destroying the design's integrity. In some cases, the beading action is so severe that the pattern is essentially destroyed. In other cases, where the pattern in the design is simple, such as a dot or multiplicity of dots, then the beading action may not totally destroy the dots. In that case, the dots lose their artistic qualities and the pattern is not a good replication of that design as created on the cliché.

In the case of solution coatings, i.e., where the coating formulation is a single solvent/resin (solution) phase with the only other phase being at most a solid phase caused by the dispersal of a solid colorant in the coating formulation, the issue is the addition of an additive to the formulation that compensates for aging of the silicone or other rubber pad. When the silicone or other rubber pad ages, they undergo small but significant chemical changes. That change is the chemisorption of oxygenated species at the surface of the pad by virtue of deterioration of the pad's surface. With deterioration comes an increase in the surface area of the pad. With the increased surface area, there develops sites that can be attacked by the atmosphere. As a result, the pad's surface becomes meaningfully more hygroscopic and less oleophilic. As a result, the normally oleophilic solution coating is less receptive to the pad's surface. This causes the transfer pattern to be less clearly defined than it had been prior to the deterioration.

In both cases, it has been determined that a small but significant amount of a wetting agent comprising an organic monomeric or polymeric compound containing hydroxyl and/or carboxyl groups, added to the latex or solution coating formulation, changes the performance characteristics of the coating formulation in transfer-pad printing to overcome those surface wettability problems.

The organic monomeric or polymeric compounds containing hydroxyl and/carboxyl groups suitable in the practice of this invention include those of the formula:

$$A\text{-}X_n$$

wherein A is an organic moiety having a number average molecular weight of at least about 15 to about 2,000,000, X is one or more of hydroxyl (—OH) and carboxyl (—COOH), and n, the number of hydroxyl and carboxyl groups, has an average value of at least one, sufficient that the weight of the hydroxyl and/or carboxyl groups ranges between about 6 to about 65 weight percent of the weight of the compound. A may contain carbon, hydrogen and any other atom therein, provided such other atom does not interfere with the function provided by X. [2] For example, A may contain other atoms from Groups 2–16 (New Notation) other than carbon, hydrogen and oxygen, provided the atoms do not form acidic or basic groups in such amounts to interfere with the wetting function of the wetting agent in enhancing wetting of the transfer-pad. Desirably, the organic moiety of A has a molecular weight of at least about 40 because lower molecular weight materials tend to be sufficiently volatile that it becomes difficult to maintain the compound in the coating composition in the course of the pad-transfer operation. However, when the pad-transfer operation is operated at low enough temperatures and at high speeds, such more volatile compounds may be preferred as wetting agents.

[2] See Chemical and Engineering News, 63 (5), 27, 1985, which formats the numbers as groups 1 to 18.

It is believed that the wetting agent functions in a manner so as to present the most favorable surface active properties in the coating composition when picked up by the transfer-pad. For example, when the pad presents an oleophilic surface, and the coating composition is a latex, it is believed the wetting agent surrounds the latex particles (micelles) with the organo composition and alter their surface active properties. It is believed the hydroxyl and/or carboxyl groups orient toward the surface active agent causing the organo portion of the molecule to face away from the particles and present a more oleophilic surface to the transfer-pad. This phenomena is illustrated in FIG. 18.

Figure 18:
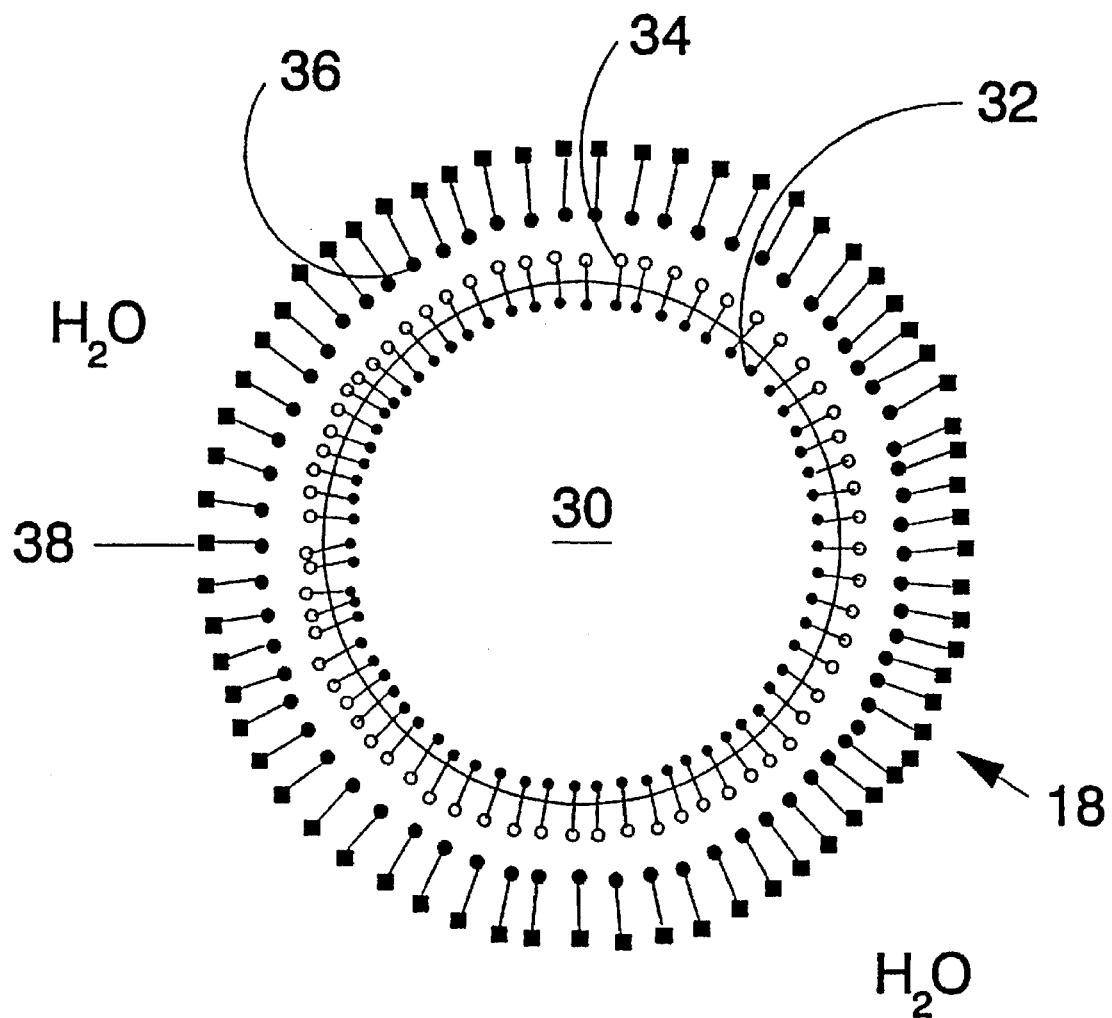
FIG. 18 is a diagrammatic illustrations of how a latex particle is altered by addition of the wetting agent in accordance with the invention.

As shown in FIG. 18, micelle 30 of the latex particle 18 has at its interface with the water phase surrounding it, surface active agent containing the oleophilic portion 32 (represented as a black solid circular markers) and its integrated hydrophilic portion 34 (represented as open circular markers). It is believed that the wetting agent surrounds the micelle by orienting the hydroxyl and/carboxyl groups 36 (represented as black circular markers) toward portions 34 and the remainder of the organic portion, 38 (represented as black square markers), of the wetting agent point away from micelle 30. As a result, when micelle 30 is coated onto the transfer pad, the organic portion 38 is oriented toward the pad's surface. Because the organic portion is more oleophilic, it better wets the pad's surface and thereby allows the coating to maintain its pattern on the pad. Subsequent transfer of the pattern from the pad to the printing surface results in an extremely good replication of the design on the printing surface. It could be argued that the micelle's stability in the aqueous phase would be compromised by the addition of the wetting agent to the latex, However, sufficient water should interface the wetting agent and the surface active agent that stability is not materially compromised. This would suggest that addition of the wetting agent could adversely affect the long term storage stability of the latex. If that should be the case, then the wetting agent should be added to the latex shortly prior to printing. It is believed that the treated latex could be stored for extended periods, certainly for longer than a day, provided that the storage temperature did not border freezing or high water evaporation conditions.

The selection of alcohols and carboxylic acids that can be used as the wetting agent are numerous. Most alcohols and carboxylic acids are useful. Some of them are preferred. Particularly desirable are mono-ols and polyols that are bonded to an organic segment that is more oleophilic than the hydroxyl portion. A polyol may contain the hydroxyl group dispersed in the molecule or they may be clustered in the molecule. Clustered polyols are believed to be preferred because they can be used in smaller concentrations and still obtain the same wetting effect. Non-clustered polyols have been shown to be very effective wetting agents in the practice of the invention. Monomeric mono-ols have been demonstrated to be effective wetting agents.

Figure 19:
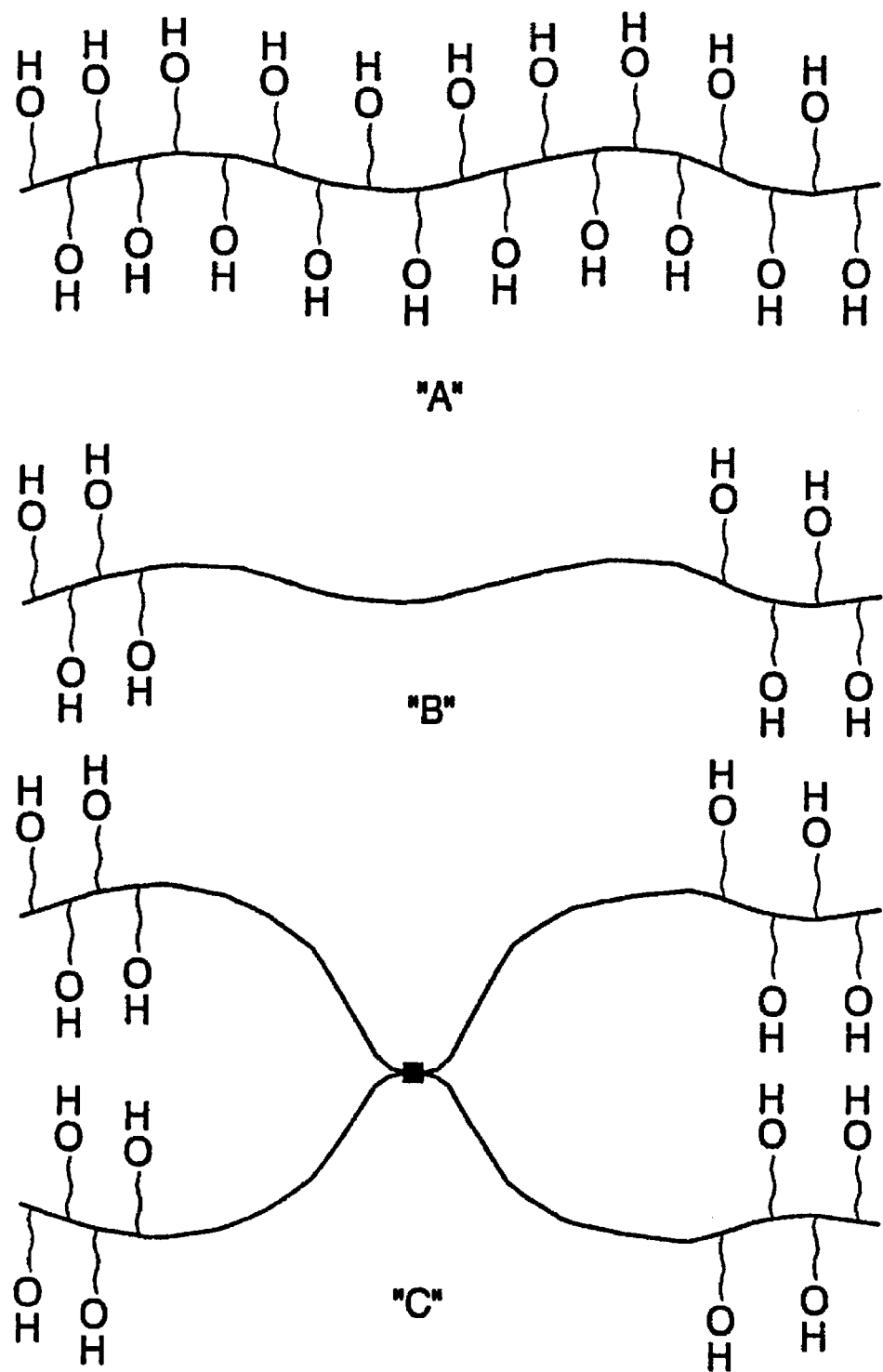
FIG. 19 is a graphical illustration of certain classes of polymeric polyols useful in the practice of the invention.

FIG. 19 is diagrammatic illustration of polyols suitably employed as wetting agents according to the invention. The polyol labeled "A" represents polymeric polyols in which the hydroxyl (—OH) is either bonded directly to the backbone of the polymer or extends as a pendant group from the backbone. Classic illustrations of this type of polyol are polyvinyl alcohol, copolymers of vinyl alcohol [3] and other olefinic monomers, alkylene oxide modified polymers that yield pendant hydroxyl, cellulosic polymers, and the like. The polyol labeled "B" represents ABA block copolymers where the A units contain pendant hydroxyl, or clustered polyols where the hydroxyl are part of extended pendant units and the interior is unit, i.e., the non-clustered portion of the molecule, is oleophilic. The polyol labeled "C" represents star type polyols wherein the molecular weight of the polymer is achieved with the minimum chain length. In FIG. 19, the polyol "C" diagram employs a square marker to characterize a gem carbon atom, or a carboxylic ring, or a tetravalent multicarbon organic unit.

[3] It is to be understood that vinyl alcohol is not the monomer used in forming the polymer, see the discussion below.

A particular good class of mono-ols are ester mono-ols of the following formula:

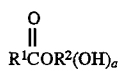

wherein $R^1$ is a monovalent organic group bonded to the carbonyl carbon by a carbon or oxygen to carbon bond, $R^2$ is a polyvalent organic group containing OH bonded to carbon atoms thereof, and $a$ is equal to the free valence of $R^2$ and the number of OH groups bonded to carbon on $R^2$.

A particularly desirable wetting agent is a polymeric polyol such as those of the following formula:

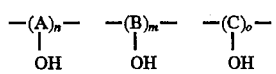

wherein A, B and C are each different alicyclic and cyclic organic groups, p is an integer of at least one, q and s are each independently 0 or a positive integer.

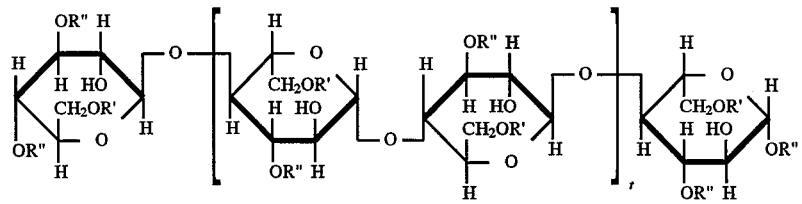

Because carboxylic acids suitability as a wetting agent is dependent upon the surfactant used in making the latex, it is desirable to test their use in the latex to determine whether they react with the surfactant and then adversely affect the latexes performance. Also, it is necessary to concern oneself about whether the carboxylic acids react with functional groups present in the solution based resin. If the carboxylic acid does not adversely react, then it is a desirable wetting agents in the practice of the invention. Of the suitable carboxylic acids for this purpose, the polymeric carboxylic acids are preferred. Illustrative of suitable carboxylic are those of the following formulae:

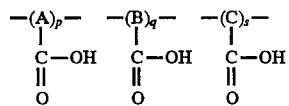

wherein A, B and C are each different alicyclic and cyclic organic groups, p is an integer of at least one, q and s are each independently 0 or a positive integer.

Illustrative of suitable lower molecular weight alcohols that tony be used as wetting agents according to the invention are:

| | |
|---|---|
| $CH_3OH$ | $CH_3CH_2OH$ |
| $CH_3CH_2CH_2OH$ | $CH_3CH(OH)CH_3$ |
| $CH_3CH_2CH_2CH_2OH$ | $CH_3CH_2(CH_3)CHOH$ |
| $CH_3(CH_3)CHCH_2OH$ | $CH_3CH_2CH_2CH_2CH_2OH$ |
| $CH_3CH_2CH_2CH(OH)CH_3$ | $CH_3CH_2CH(OH)CH_2CH_3$ |
| $CH_3CH_2CH(OH)CH_2CH_3$ | $CH_3(CH_3)C(OH)CH_2CH_3$ |
| $CH_3(CH_3)CHCH(OH)CH_3$ | $CH_3CH_2CH_2CH_2CH_2OH$ |
| $CH_3CH_2CH_2CH_2CH(OH)CH_3$ | $CH_3CH_2CH_2CH(OH)CH_2CH_3$ |
| $CH_3CH_2CH_2(CH_3)CHCH_2OH$ | $CH_3CH_2(CH_3)CHCH_2CH_2OH$ |
| $CH_3CH_2(CH_3CH_2)CHCH_2OH$ | $CH_3(CH_3CH_2)CHCH_2CH_2OH$ |
| $CH_3(CH_2)_8OH$ | $CH_3(CH_2)_{17}OH$ |
| $CH_3(CH_2)_8(CH_3)CH_2OH$ | $C_6H_{11}OH$ |
| $C_6H_{11}CH_2OH$ | $C_6H_5CH_2OH$ |
| o-$C_6H_5(CH_2OH)_2$ | p-$C_6H_5(CH_2OH)_2$ |
| 1,2,4-$C_6H_5(CH_2OH)_3$ | p-$C_6H_5(CH_2CH_2OH)_2$ |
| $HOCH_2CH_2OH$ | $HOCH_2CH_2CH_2OH$ |
| $HOCH_2CH_2CH_2CH_2OH$ | $HO(CH_2)_{4-17}CH_2OH$ |
| $(HOCH_2)_4C$ | 1,4-$HOC_6H_4CH_2OH$ |
| $C_6H_5CH_2OCH_2CH_2CH_2OH$ | $CH_3OCH_2CH_2CH_2CH_2OH$ |
| $CH_3O(CH_2)_{4-17}CH_2OH$ | sym-$CH_3OC_6H_4CH_2OH$ |
| $CH_3(OCH_2CH_2)_{1-30}OH$ | |

The polymeric polyols comprise a wide variety of polymers each characterized by the presence of pendant and/or terminal hydroxyl groups. A particularly desirable class of polymeric polyols comprise polyvinyl alcohol, copolymers of vinyl alcohol [4] and other ethylenically unsaturated monomers, such as ethylene, vinyl acetate, methylmethacrylate, methylacrylate, and the like. Another very valuable class of wetting agents are the hydroxylated cellulosics such as those of the formula where R' and R' are each one of hydrogen, hydroxyalkyl and hydroxyalkyleneoxyalkyl, "t" is a number of at least 1, and the alkyl contain from 1 to about 4 carbon atoms, preferably ethylene and alkyl substituted ethylene, such as 1,2-propylene.

[4] It is recognized that vinyl alcohol does not exist as such, so this term relates to its monomeric precursors that on hydrolysis converts to the polymerized vinyl alcohol structure, viz., —$CH_2CH(OH)$—, such as vinyl acetate, vinyl propionate, and the like.

Another class of polyols are the organic diol, triol, tetraol, pentaol, and the like. Illustrative are the following compounds: ethylene glycol, diethylene glycol, triethylene glycol, tetraethylene glycol, 1,2-propylene glycol, di-1,2-propylene glycol, tri-1,2-propylene glycol, tetra-1,2-propylene glycol, 1,4-butanediol, 1,3-propanediol, and the like; or formed from by the alkoxylation of a starter polyol, such as the class of polyols characterized; or formed from reaction of the above diols, triols, etc., with caprolactone. The resulting ester polyols ("Tone's") are widely used in reactions with isocyanate. Desirable alkoxylated polyols are alkylene oxide adducts of a hydroxylated alcohols of the formula:

and preferably a "starter" diol, triol, tetraol and higher hydroxylated alcohols, of the formula

wherein A is a polyvalent organic moiety, the free valence of which is 2–6 or greater, or an average value equal thereto, as the case rosy be.

Illustrative of suitable compounds embraced by the "starter" $A(OH)_{\geq 2-6}$ alcohol are the following: ethylene glycol, diethylene glycol, 1,2-propylene glycol, polyethylene glycol, polypropylene glycol, glycerine, pentaerythritol, sorbitol, diether of sorbitol, mannitol, diether of mannitol, arabitel, diether or arabitel, sucrose, mixtures thereof, and the like.

The starter $A(OH)_{\geq 2-6}$ is first reacted with 1,2-alkylene oxide in an amount and under conditions sufficient to convert its hydroxyl groups to hydroxyalkyl groups. The amount of 1,2-alkylene oxide reacted is sufficient to achieve the ultimate molecular weight of the alkoxylated polyol adduct. The molecular weight of the dioxylated polyol adduct should be relatively high, preferably above about 4000 (number average) and, more preferably, above about 5000. The minimum molecular weight of the alkoxylated polyol adduct may be about 2000. The preferred 1,2-alkylene oxides are lower 1,2-alkylene oxides, such as ethylene oxide, 1,2-propylene oxide, 1,2-butylene oxide, and the like. The resulting polyol may be hydroxyethyl capped by reaction with 1,2-ethylene oxide to provide assurance of primary hydroxyl content in the polyol especially if the alkoxylated polyol adduct is subsequently coupled, not polymerized, with an organic polyisocyanate. Such alkoxylation reactions, with consequent adduct formation, is well known in the art. Adduct reactions may be base or acid catalyzed, with base catalyzation preferred.

Illustrative of suitable carboxylic acids are the following monomeric carboxylic acids:

| | |
|---|---|
| $CH_3COOH$ | $CH_3CH_2COOH$ |
| $CH_3CH_2CH_2COOH$ | $CH_3CH(COOH)CH_3$ |
| $CH_3CH_2CH_2CH_2COOH$ | $CH_3CH_2(CH_3)CHCOOH$ |
| $CH_3(CH_3)CHCH_2COOH$ | $CH_3CH_2CH_2CH_2CH_2COOH$ |
| $CH_3CH_2CH_2CH(COOH)CH_3$ | $CH_3CH_2CH(COOH)CH_2CH_3$ |
| $CH_3CH_2CH(COOH)CH_2CH_3$ | $CH_3(CH_3)_2C(COOH)CH_2CH_3$ |
| $CH_3(CH_3)CHCH(COOH)CH_3$ | $CH_3CH_2CH_2CH_2CH_2CH_2COOH$ |
| $CH_3CH_2CH_2CH_2CH(COOH)CH_3$ | $CH_3CH_2CH_2CH(COOH)CH_2CH_3$ |
| $CH_3CH_2CH_2(CH_3)CHCH_2COOH$ | $CH_3CH_2(CH_3)CHCH_2CH_2COOH$ |
| $CH_3CH_2(CH_3CH_2)CHCH_2COOH$ | $CH_3(CH_3CH_2)CHCH_2CH_2COOH$ |
| $CH_3(CH_2)_8COOH$ | $CH_3(CH_2)_{17}COOH$ |
| $CH_3(CH_2)_8(CH_3)CH_2COOH$ | $C_6H_{11}COOH$ |
| $C_6H_{11}CH_2COOH$ | $C_6H_5CH_2COOH$ |
| o-$C_6H_5(CH_2COOH)_2$ | p-$C_6H_5(CH_2COOH)_2$ |
| 1,2,4-$C_6H_5(CH_2COOH)_3$ | p-$C_6H_5(CH_2CH_2COOH)_2$ |
| $HOCH_2CH_2COOH$ | $HOCH_2CH_2CH_2COOH$ |
| $HOCH_2CH_2CH_2CH_2COOH$ | $HO(CH_2)_{4-17}CH_2COOH$ |
| $(HOOCCH_2)_4C$ | 1,4-$HOC_6H_4CH_2COOH$ |
| $C_6H_5CH_2OCH_2CH_2CH_2COOH$ | $CH_3OCH_2CH_2CH_2COOH$ |
| $CH_3O(CH_2)_{4-17}CH_2COOH$ | sym-$CH_3OC_6H_4CH_2COOH$ |
| $CH_3(OCH_2CH_2)_{1-30}COOH$ | |

Particularly preferred are the polymeric polycarboxylic acids such as those of the formula

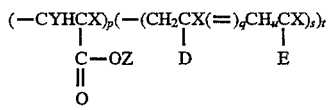

wherein each X is the same or different alicyclic and cyclic organic group; p is an integer of at least one, q, s and u are each independently 0 or a positive integer dependent on free valence, and t is a positive integer; Z is H or carboxyalkyl, and the like; Y is carboxyl or hydrogen; D is H, alkyl, carboxylate, carboxyl, acyloxy, chlorine, and the like; E is H, alkyl, carboxylate, carboxyl, acyloxy, chlorine, and the like.

Incorporation of the wetting agent into the coating formulation is readily accomplished by simply mixing it into the liquid coating composition. In the usual case, mixing can be effected with a paddle mixer, though high speed mixing, even with shear, is within the contemplation of the invention.

The amount of wetting agent used in the coating composition is quite variable and frequently depends on the wetting agent chosen and the coating characteristics of the coating composition without the wetting agent. Certain wetting agents are employed in lesser amounts than others. For example, hydroxyethyl cellulose (HEC) is typically used in smaller quantities than other wetting agents. On the other hand, the mono-ols such as monohydroxyethyl methacrylate (HEMA) may be used in large amounts, up to 50 weight percent of the composition. Typically, the amount of wetting agent will not exceed about 50 weight percent of the coating composition. On the other side of the scale, it will usually be employed in amounts of at least about 0.5 weight percent of the weight of the coating composition.

The invention finds employment in any pad printing operation. It may be used to coat light bulbs; watch faces; golf balls; form printed circuits on dielectric substrates; imprint bar codes on a variety of surfaces; and add patterns to a contact lens mold or on a contact lens.

A preferred use of the invention is in making natural-looking opaque tinted contact lenses. They can be produced by pad printing an iris pattern onto contact lens molds with a mixture of commercially available acrylic latex prints and a wide variety of wetting agents, as illustrated above.

Specific ones that have been demonstrated are HEMA (2-hydroxyethyl methacrylate), HPMA (hydroxypropyl methacrylate), PVA (polyvinyl alcohol), HEC (hydroxyethyl cellulose), and PAA (polyacrylic acid).

Figure 15:
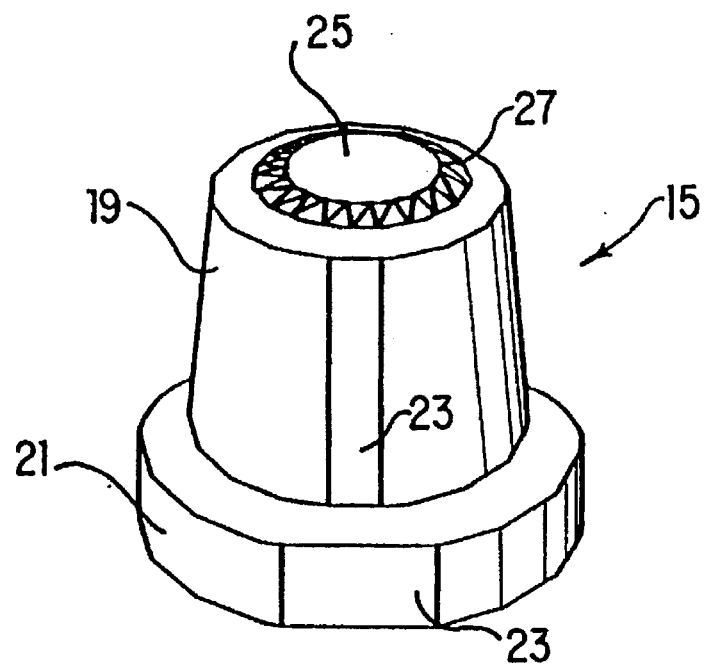
FIG. 15 is a perspective illustration of a silicone rubber tampon containing a transferred design.
Figure 16:
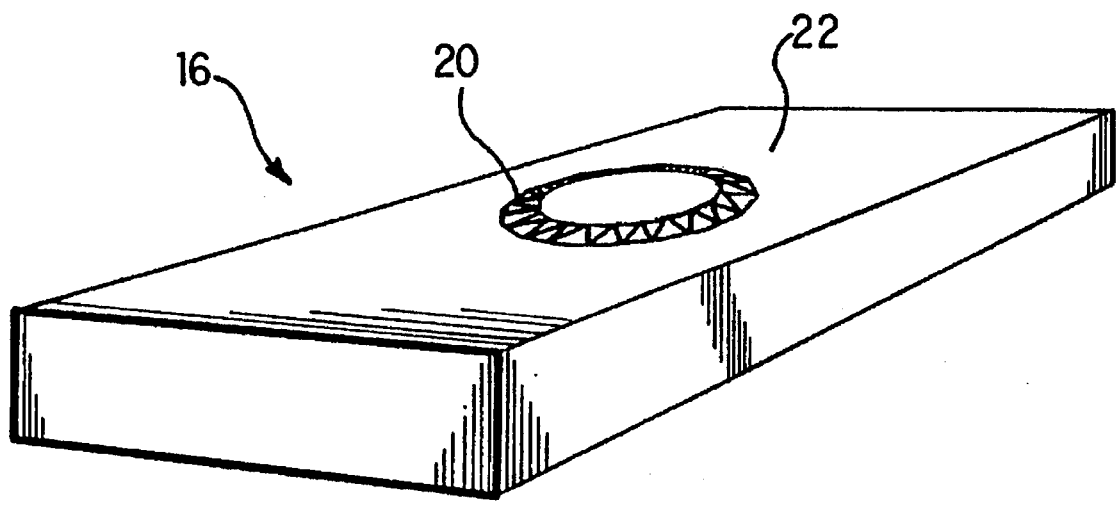
FIG. 16 is a cliché containing an etched complex design to be pad transferred.
Figure 17:
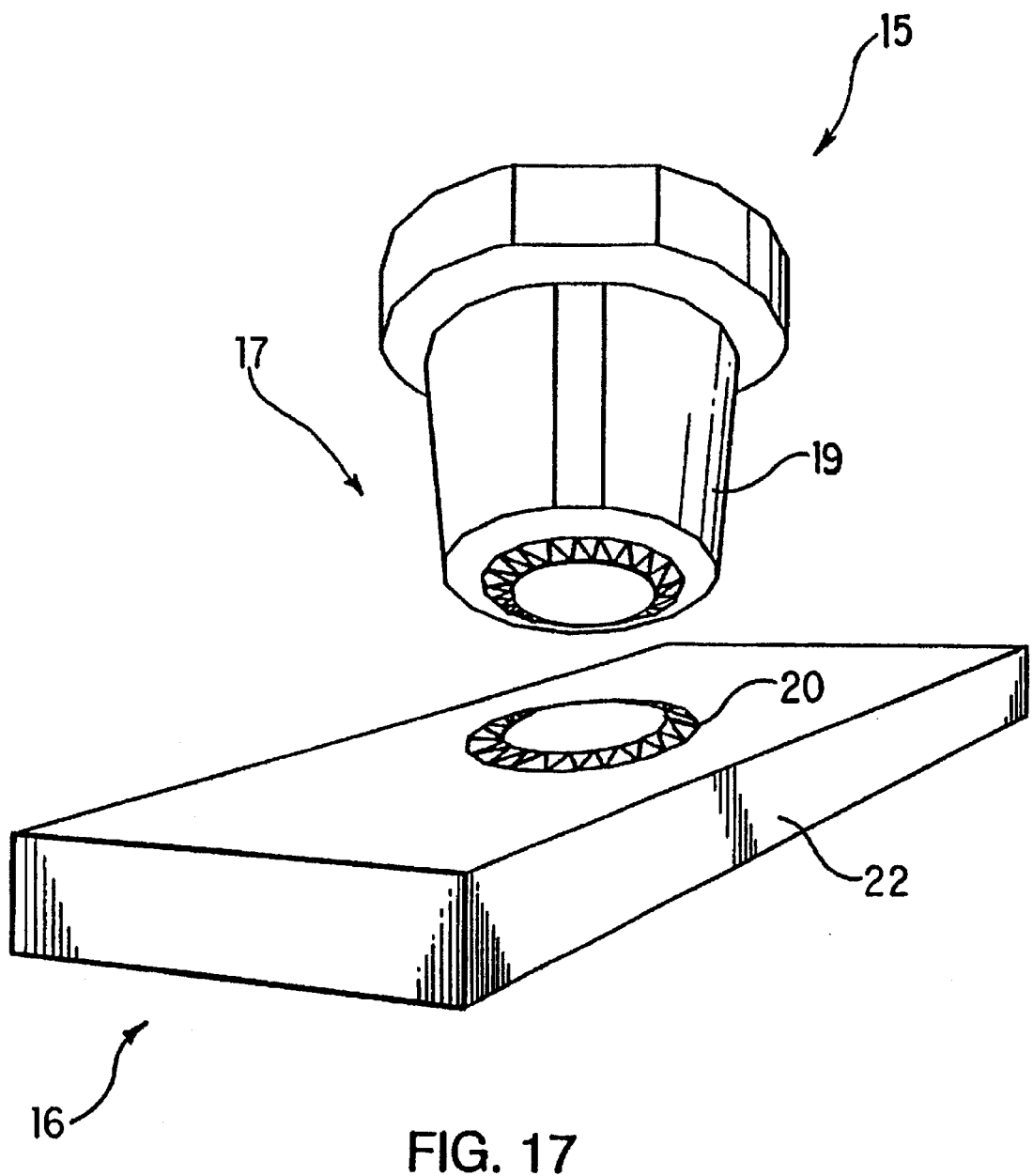
FIG. 17 illustrates the superimposition of the tampon of FIG. 15 over the cliché of FIG. 16 in which the etched design is filled with a latex coating composition according to invention.

With respect to FIGS. 15, 16 and 17, an artificial iris pattern such as shown in FIG. 1, is photochemically etched into cliché 16 (FIG. 16), the metal master of the pattern, consisting of a series of interconnecting lines that closely resembles the radial striations of the human iris. It is shown in FIG. 16 as 20. In the preferred embodiment, the iris pattern is a series of interconnecting fines as shown in FIG. 1, that are photochemically etched into metal to a depth of about 0.010 mm to 0.050 turn with 0.030 preferred etching depth. The line width of the iris pattern etched into the metal master is 0.020 mm to 0.200 mm with 0.080 mm being preferred. The iris pattern coverage ranges from 25% to 50% of the visible iris with 30% visible iris coverage being the preferred amount of coverage. In most cases the whole of the iris portion is film coated with the pattern density in the iris portions being in the above ranges. The range for pupil diameter is from 2.0 mm. to 10.0 mm with 4.29 mm being the preferred pupil diameter. The range for iris outer diameter is from 5.0 mm to 13.0 mm with 10.30 mm being the preferred diameter.

A pigmented coating composition containing the desired wetting agent of the invention, is edge coated into the etched pattern of cliché 16 comprising metal block 22. A silicone rubber tampon 15, FIG. 15, comprising the low durometer silicone rubber pad 19 with transfer surface 25, a stiff handle 21, each containing registration surface 23, may be used to transfer design 20 from cliché 16 to the mold (not shown). Pad 15, as shown in FIG. 17, is turned onto the cliché so that pad surface 25 (see FIG. 17) is pressed onto pattern 20 on metal block 22. By gently flattening surface 25 over pattern 20, the coating with the wetting agent of the invention, in the pattern 27, is cleanly transferred to the tampon's transfer surface 25. Then the tampon is pressed onto a polypropylene mold used for making a soft contact lens. Once the mold has been printed, the coating is allowed to dry, in the case of a latex coating, or cure in the case of a thermosetting coating, before being filled with lens monomer. The lens monomer swells the iris pattern thus lifting it off from the mold surface. The enveloped iris pattern is then fixed into the lens matrix upon curing leaving essentially no portion of the iris pattern protruding from the surface of the finished contact lens. The resulting colored contact lens is natural in appearance, comfortable and is capable of changing the natural iris color of the wearer (from brown to blue), or enhancing the one's natural iris color (from blue to green).

Lenses produced according to this invention are:
1) Very natural in appearance due to the configuration and resolution of the iris pattern.
2) Very reproducible in a continuous operation because both the cliché pattern pickup and transfer from the tampon to the mold are uniform throughout the cycle of the continuous operation.

A single metal master may be used to print thousands of molds. The molds (concave or convex and made preferably of polymers such as polypropylene and other thermoplastic materials) are pad printed with commercially available, acrylic latex prints which coating pigment, acrylic resin media and a desired wetting agent. When, as will be shown, the acrylic latex paints are not modified according to the invention, they are not as suitable for pad printing. For example, if they are used unaltered, there will be an incomplete transfer of the iris pattern to the silicone transfer pad. Through the addition of the wetting agents, a more suitable paint mixture is attained for pad printing.

The mixture of latex paint and "wetting" agent is placed into an ink cup which traverses over the metal cliché containing the iris pattern and deposits the paint into the etched pattern. This action fills the etching with the paint mixture and the excess paint is neatly removed by means of a doctoring blade such as a single edged razor blade. A silicon rubber pad descends onto the metal master and picks up the paint mixture in the form of an intact iris pattern. Next the pad contacts the mold thus transferring the iris pattern from the pad to the mold.

After printing, the mold is given time to dry before being filled with lens monomer. This action swells the printed iris pattern which in turn ruts the iris pattern off of the mold surface. The enveloped iris pattern is then carried into the solid matrix of the formed lens without leaving any of the iris pattern protruding from the surface of the finished lens.

The resulting contact lens is natural in appearance, comfortable and is capable of changing the natural iris color of the subject (from brown to blue), or enhancing the one's natural iris color (from blue to green).

The preferred coating used in making the cosmetic contact lenses are typically prepared by mixing commercially available acrylic latex paints, such as those obtainable from a typical artist supply house, such as Binney and Smith, with the wetting agent. The acrylic latex paints may comprise from about 50.0% to 99.5% by weight of the coating mixture, the remainder being the wetting agent. The preferred level is about 90.0% by weight.

The following acrylic print composition based on a Bright Aqua Green acrylic print from Binney and Smith, modified with various wetting agents by mixing thoroughly with a spatula, were employed in pad printing to a silicone transfer pad and then to a polypropylene contact lens mold for making soft contact lenses by cast molding:

TABLE 1

| Ex. No. | Weight of Acrylic Latex | Wetting Agent (Amount in grams) | Wt. % Wetting Agent of Coating Composition |
|---|---|---|---|
| 1. | 9.0 | HEMA (1.0) | 10.0 |
| 2. | 9.0 | PVA (1.0) 50/50 in water | 5.0 |
| 3. | 9.0 | HPMA (1.0) | 10.0 |
| 4. | 9.0 | PAA (1.0) 50/50 in water | 5.0 |
| 5. | 9.0 | HEC (1.0) 8/92 in water | 0.8 |
| 6. | 10.0 | NONE | not applicable |

In the above table,
1. HEMA stands for hydroxyethyl methacrylate of the formula:

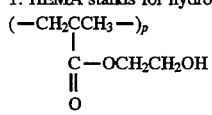

wherein p is an integer of at least one, preferably at least 2 or more.
2. PVA stands for polyvinyl alcohol having the repeating unit formula:

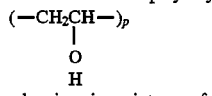

wherein p is an integer of at least one, preferably at least 2 or more.
3. HPMA stands for hydroxypropyl methacrylate of the formula:

TABLE 1-continued

| Ex. No. | Weight of Acrylic Latex | Wetting Agent (Amount in grams) | Wt. % Wetting Agent of Coating Composition |
|---------|------------------------|--------------------------------|---------------------------------------------|

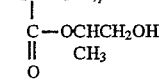

wherein p is an integer of at least one, preferably at least 2 or more.
4. PAA stands for polyacrylic acid having the repeating unit formula:

wherein p is an integer of at least one, preferably at least 2 or more.
5. HEC stands for hydroxy ethyl cellulose having the repeating unit formula:

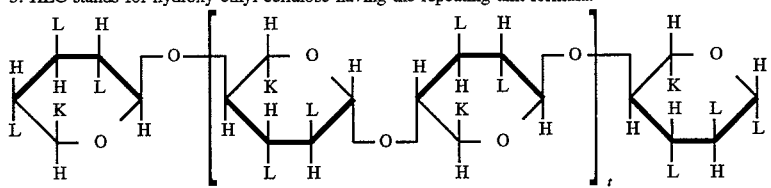

wherein "t" is a number of at least 1 and "L" is a structure having the formula: $O(CH_2CH_2)_bOH$; K is a structure having the formula: $CH_2O(CH_2CH_2)_bOH$; "b" is 0 or a number of at least 1, provided that at least 2 of L or K has in them b having a value of at least 1.

In the case of the use of HEMA or HPMA, because they are monomeric materials and therefore can be used in the largest amounts they can comprise from about 0.50% to 50.0% by weight of the mixture with the preferred level being about 10.0% by weight. The polymeric wetting agents need not be used in large concentrations. As can be seen with the use of PVA, PAA and HEC, the polymeric wetting agents, they are typically used in amounts of less than about 10 weight percent of the acrylic latex, though greater amounts are within the contemplation of the invention.

Acrylic latex paints containing one or more of the following pigments are suitable hues to use on the eye:

| Pigment | Color Index |
|---------|-------------|
| chromium oxide green | 77288 |
| phthalocyanine green | 74260 |
| phthalocyanine blue | 74160 |
| iron oxide | 77491 |
| titanium dioxide | 77891 |
| carbazole violet | 51319 |

The degree of opacity may be controlled by adjusting the level of titanium dioxide in the paint.

Figure 2:
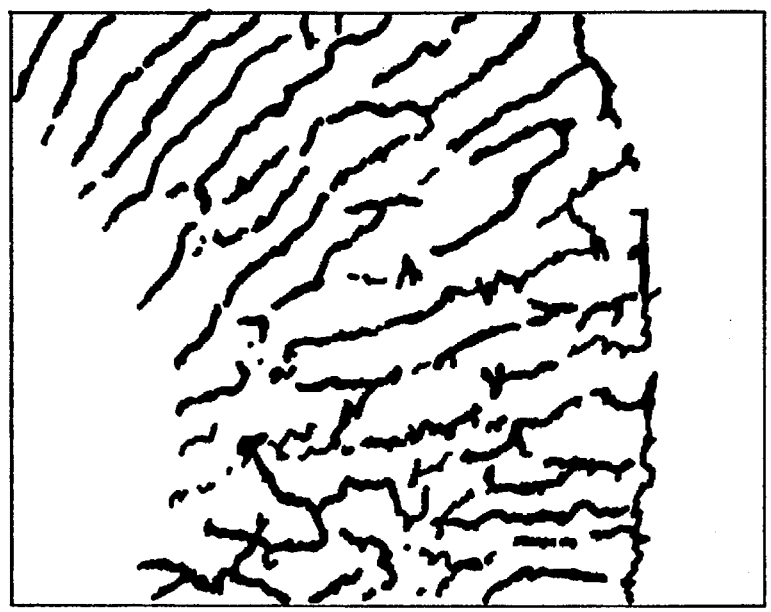
FIG. 2 correlates the video image segment of FIG. 3 showing an modified latex composition, not of the invention, of the cosmetic pattern of FIG. 1 captured on a silicone rubber tampon.
Figure 3:
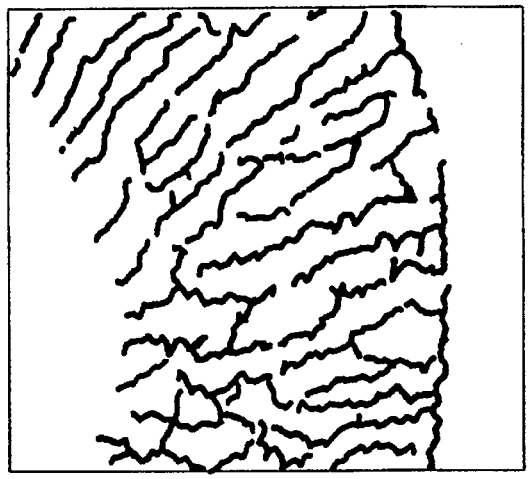
FIGS. 3–14 show video imaged segments of the cosmetic pattern coated on either a silicone tampon, specifically FIGS. 3, 5, 7, 9, 11 and 13, or on a polypropylene mold surface, specifically FIGS. 4, 6, 8, 10, 12 and 14, by transfer from the tampon.

The advantages of the invention are readily discernible from the graphics illustrated in FIGS. 1-14 hereof. FIG. 1 shows a desired cosmetic design for printing onto polypropylene molds for cast molding soft hydrogel contact lenses. Boxed area A of FIG. 1 was used to photograph by video tape, as shown by the relationship of area A to FIG. 2, actual pad printings using the formulations of Table 1. In the drawings, FIGS. 2 and 3 are the same. They both represent the latex of example 10, Table 1, as received on the silicone pad, such as represented in FIG. 15, using the procedure described above with respect to FIGS. 16 and 17. The latex, absent a wetting agent of the invention, is edge coated into the design on cliché 16 having an etched pattern replicating that of FIG. 1. The silicone tampon 15 is pressed against cliché 16 as shown in FIG. 17 so that the latex is picked up onto surface 25 of tampon 15, providing pattern 27 thereon.

FIGS. 2 and 3 show the result. As can be seen, the lines making up the pattern in FIG. 1 are broken up in many places leaving an imperfect design on the tampon.

Figure 4:
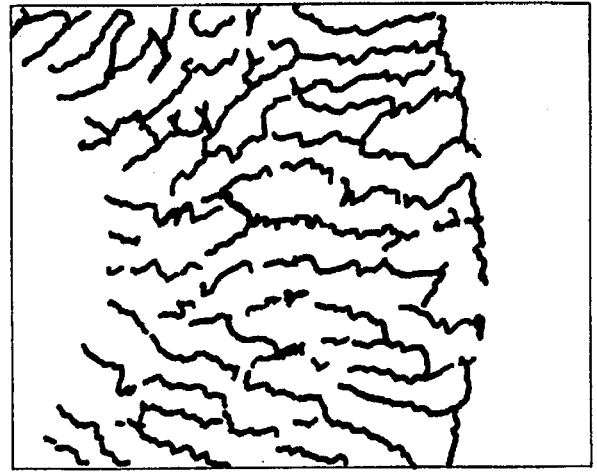
Figure 5:
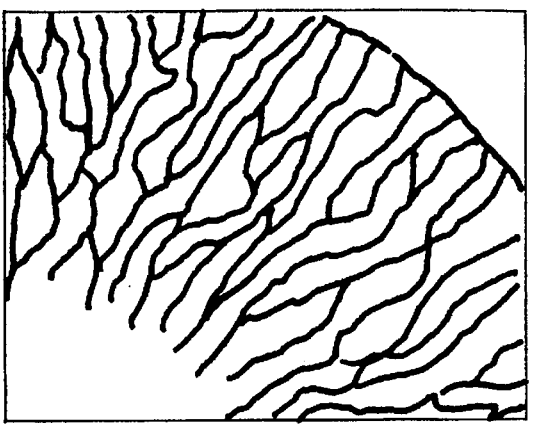
Figure 6:
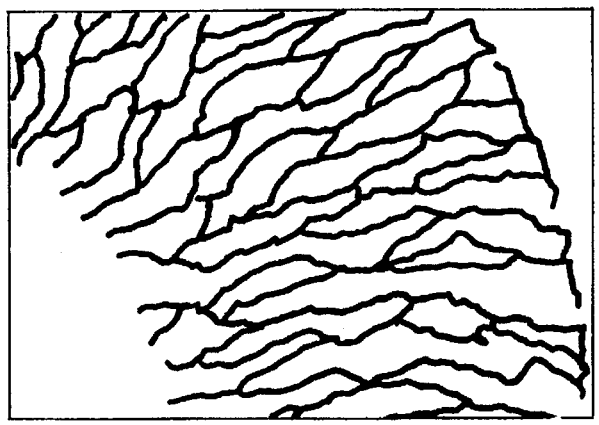
Figure 7:
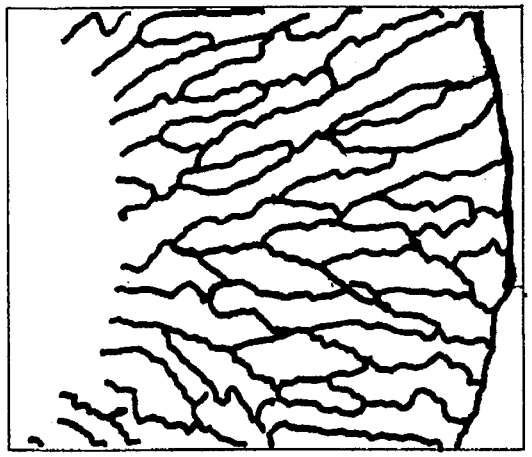
Figure 8:
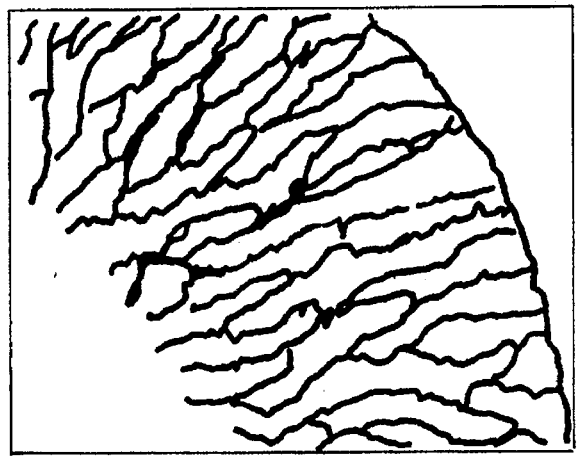
Figure 9:
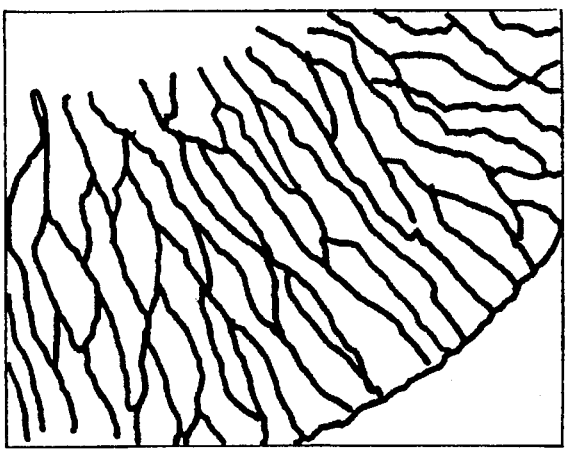
Figure 10:
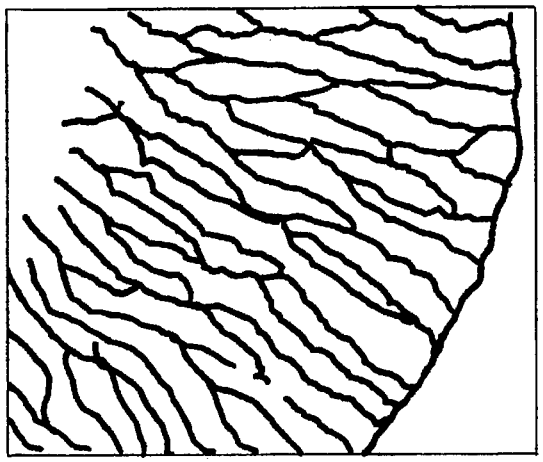
Figure 11:
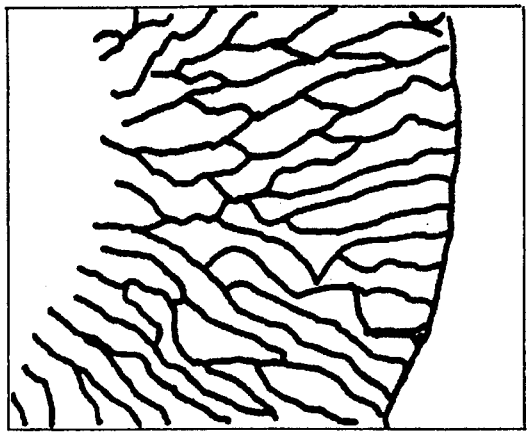
Figure 12:
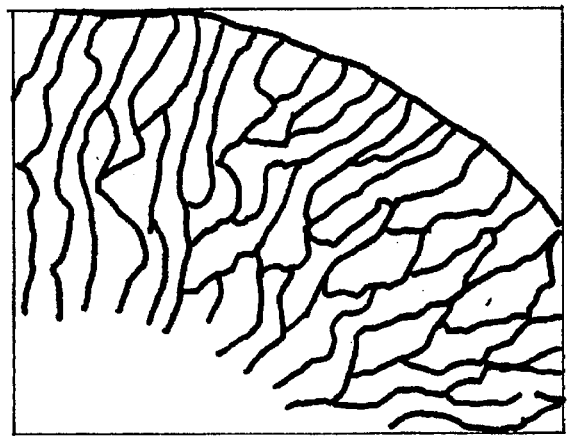
Figure 13:
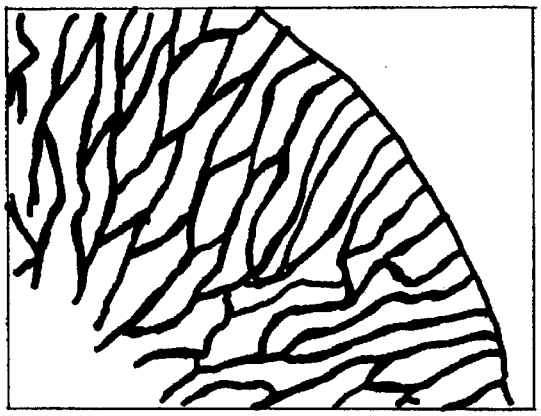
Figure 14:
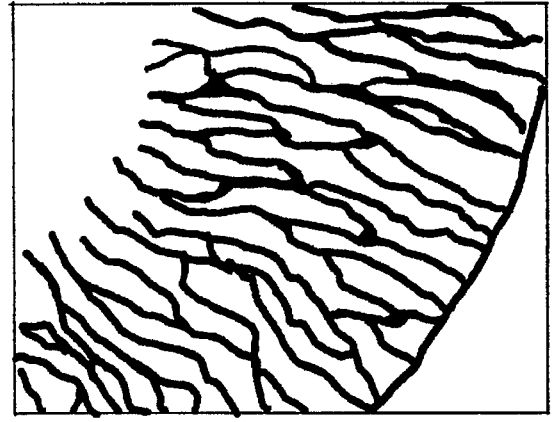

FIG. 4 shows what happens when the design on tampon, as shown in FIGS. 2 and 3, was transferred to the polypropylene mold surface. The irregularities and imperfections of the design on the tampon was transferred to the polypropylene mold. In this case, the pattern on the mold appears to have more defects than the pattern on the silicone tampon.

The remaining FIGS. 5-14 replicate examples 1-9 of Table 1, in which the paint formulations containing the wetting agents are picked up on the silicone tampons following the same procedure as for FIGS. 2 and 3, and then pad printed on the polypropylene mold, by the same procedure used for FIG. 4. The following Table 2 keys the experiments with the Figures.

TABLE 2

| Figure No. | Example No. | Tampon (T) or Polypropylene (PP) |
|------------|-------------|----------------------------------|
| 3 | 6 | T |
| 4 | 6 | PP |
| 5 | 1 | T |
| 6 | 1 | PP |
| 7 | 3 | T |
| 8 | 3 | PP |
| 9 | 5 | T |
| 10 | 5 | PP |
| 11 | 2 | T |
| 12 | 2 | PP |
| 13 | 4 | T |
| 14 | 4 | PP |

These experiments and the corresponding illustrations as recorded in FIGS. 5-14 demonstrate the clear advantage in print transfer quality using the compositions of the invention. In some cases, the video shot of the transferred pattern was inferior to others, suggesting that one wetting agent might be superior to another. In actuality, that is not the case. For example, the video shot of FIG. 6 poorly shows the actual pattern on the polypropylene mold. It was believed that a distortion crept in the taking the picture.

Though this invention has been described with respect to specific embodiments, it is not intended that the invention be limited thereby.

What is claimed is:

1. A process for preparing a mold for use in preparation of a polymeric lens having an iris design molded therein, the process comprising transferring a wet coating comprising a thermoplastic or thermosetting aqueous polymeric coating composition and a wetting agent selected from the group consisting of polymerizable monomers and polymers containing hydroxyl or carboxyl groups in the form of a thin design of the iris onto a transfer-pad and then transferring the design onto a surface of a mold and allowing the design to dry.

2. A transfer-pad process for preparing a polymeric lens having an iris design molded therein comprising
   a) transferring a wet coating in the form of a thin design from a cliche onto a transfer-pad,
   b) transferring the design from the pad onto a surface of a mold,
   c) allowing the design to dry,
   d) filling the mold with lens monomer, and
   e) curing the lens monomer
wherein the wet coating comprises an aqueous polymeric coating vehicle and a wetting agent selected from the group consisting of polymerizable monomers and polymers containing hydroxyl or carboxyl groups.

3. A process according to claim 1 wherein the aqueous polymeric coating composition is a latex coating composition.

4. A process according to claim 3 wherein the latex is an acrylic latex.

5. A process according to claim 1 wherein the wetting agent is hydroxyethylmethacrylate.

6. A process according to claim 1 wherein the wetting agent is hydroxypropylmethacrylate.

7. A process according to claim 1 wherein the wetting agent is polyvinyl alcohol.

8. A process according to claim 1 wherein the wetting agent is hydroxyethylcellulose.

9. A process according to claim 1 wherein the wetting agent contains carboxyl groups.

10. A process according to claim 3 wherein the wetting agent is polyacrylic acid.

11. A process according to claim 1 wherein the lens is a soft contact lens.

12. A process according to claim 2 wherein the aqueous polymeric coating vehicle is a latex coating composition.

13. A process according to claim 12 wherein the latex is an acrylic latex.

14. A process according to claim 2 wherein the wetting agent is hydroxyethylmethacrylate.

15. A process according to claim 2 wherein the wetting agent is hydroxypropylmethacrylate.

16. A process according to claim 2 wherein the wetting agent is polyvinyl alcohol.

17. A process according to claim 2 wherein the wetting agent is hydroxyethylcellulose.

18. A process according to claim 2 wherein the wetting agent contains carboxyl groups.

19. A process according to claim 18 wherein the wetting agent is polyacrylic acid.

20. A process according to claim 2 wherein the lens is a soft contact lens.

* * * * *